(12) United States Patent
Wigren et al.

(10) Patent No.: US 10,694,425 B2
(45) Date of Patent: Jun. 23, 2020

(54) MANAGEMENT OF 5G SPLIT BEARER FLOW CONTROL

(71) Applicant: Telefonaktiebolaget LM Ericsson (publ), Stockholm (SE)

(72) Inventors: Torbjörn Wigren, Uppsala (SE); Ramon Alejandro Delgado Pulgar, Elermore Vale (AU); Katrina Lau, Wallsend (AU); Richard Middleton, North Lambton (AU); Walter Müller, Upplands Väsby (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 16/303,226

(22) PCT Filed: Jun. 3, 2016

(86) PCT No.: PCT/SE2016/050530
§ 371 (c)(1),
(2) Date: Nov. 20, 2018

(87) PCT Pub. No.: WO2017/209671
PCT Pub. Date: Dec. 7, 2017

(65) Prior Publication Data
US 2019/0208444 A1 Jul. 4, 2019

(51) Int. Cl.
*H04W 28/10* (2009.01)
*H04W 28/02* (2009.01)
(Continued)

(52) U.S. Cl.
CPC .......... *H04W 28/10* (2013.01); *H04L 1/0072* (2013.01); *H04L 1/1887* (2013.01);
(Continued)

(58) Field of Classification Search
CPC .............................. H04W 28/10; H04L 1/0072
(Continued)

(56) References Cited

U.S. PATENT DOCUMENTS 7,813,272 B2 * 10/2010 Seki ...................... H04L 1/1671
370/229
7,848,298 B2 12/2010 Attar et al.
(Continued)

FOREIGN PATENT DOCUMENTS

JP 2013-153464 A 8/2013
JP 2015-198259 A 11/2015
(Continued)

OTHER PUBLICATIONS

Office Action including Search Report and English translation for Russian Patent Application No. 2018146118/08 (077079) dated Oct. 9, 2019, 10 pages.
(Continued)

*Primary Examiner* — Peter G Solinsky
(74) *Attorney, Agent, or Firm* — Sage Patent Group (57) ABSTRACT

The solution presented herein manages the feedback from multiple transmission points by reducing the amount of feedback provided by one or more slave nodes to a controlling master node. To that end, methods and apparatus are provided that determine whether there is a need for the slave node to provide feedback to the master node. Responsive to this determination, the methods and/or apparatus operate the master and/or slave node in a reduced feedback mode that manages the feedback provided by the slave node to the master node such that an amount of feedback provided by the slave node when operating in the reduced feedback mode is less than an amount of feedback provided by the slave node when operating in a full feedback mode.

20 Claims, 6 Drawing Sheets (51) Int. Cl.
H04L 1/18 (2006.01)
H04L 1/00 (2006.01)
H04L 5/00 (2006.01)
H04W 84/20 (2009.01)

(52) U.S. Cl.
CPC ....... *H04L 5/0098* (2013.01); *H04W 28/0252* (2013.01); *H04W 28/0278* (2013.01); *H04W 84/20* (2013.01)

(58) Field of Classification Search
USPC .......................................................... 370/229
See application file for complete search history.

(56) References Cited

U.S. PATENT DOCUMENTS

| | | | |
|---|---|---|---|
| 8,149,765 B2* | 4/2012 | Niwano | H04L 5/0053 370/326 |
| 8,213,368 B2 | 7/2012 | Hui et al. | |
| 8,284,706 B2 | 10/2012 | Ulupinar et al. | |
| 8,705,472 B2* | 4/2014 | Taoka | H04B 7/0417 370/229 |
| 8,908,587 B2 | 12/2014 | Wang | |
| 2015/0288427 A1* | 10/2015 | Wang | H04W 72/1284 370/329 |

FOREIGN PATENT DOCUMENTS

| | | |
|---|---|---|
| RU | 2381635 C2 | 2/2010 |
| RU | 2457626 C2 | 7/2012 |
| RU | 2478258 C2 | 3/2013 |
| WO | 2007/013457 A | 2/2007 |
| WO | 2013/014845 A | 1/2013 |
| WO | 2016/021306 A | 2/2016 |

OTHER PUBLICATIONS

International Search Report and Written Opinion of the International Searching Authority for International Application No. PCT/SE2016/050530 dated Feb. 16, 2017.
Ravanshid et al., "Multi-Connectivity Functional Architectures in 5G," IEEE International Conference on Communications Workshops, May 23, 2016, pp. 187-192.
LG Electronics Inc., "New RB configurations in 5G," R2-164151, 3GPP TSG-RAN WG2 Meeting #94, Nanjing, China, May 23-27, 2016, 2 pages.
Ericsson, "Flow control for split bearer option," R3-140819, 3GPP TSG-RAN WG3 Meeting #83bis, San Jose del Cabo, Mexico, Mar. 31-Apr. 4, 2014, 3 pages.
Nsn et al., "Flow control over the X2 interface for split bearer," R3-140614, 3GPP TSG-RAN WG3 Meeting #83bis, San Jose del Cabo, Mexico, Mar. 31-Apr. 4, 2014, 6 pages.
Decision to Grant, including English translation, for Russian Patent Application No. 2018146118/08(077079) dated Dec. 18, 2019, 21 pages.
Japanese Office Action dated Jan. 7, 2020 for Japanese Patent Application No. 2018-562281, 8 pages (includes English Translation).

* cited by examiner

MANAGEMENT OF 5G SPLIT BEARER FLOW CONTROL

CROSS REFERENCE TO RELATED APPLICATION

This application is a 35 U.S.C. § 371 national stage application of PCT International Application No. PCT/SE2016/050530, filed on Jun. 3, 2016, the disclosure and content of which is incorporated by reference herein in its entirety.

TECHNICAL FIELD

The solution presented herein relates generally to multi-node data flow control, and more particularly to managing the feedback provided by multiple slave nodes to a controlling master node.

BACKGROUND

Wireless systems have conventionally been designed to efficiently handle the transfer of data between a single network node, e.g., base station, and a single terminal, e.g., user equipment (UE), for standard communication frequencies, e.g., 1-2 GHz. The need for higher capacity, however, is resulting in a shift to higher carrier frequencies and/or transmissions by multiple network nodes, which is generally referred to as multi-point transmission.

The shift to higher carrier frequencies typically reduces the useful power experienced by the receiver. In particular, higher radio frequencies cause the radio propagation to transform from a diffuse scattering to a more beamlike propagation. The resulting sharp diffraction effects and increased radio shadowing (e.g., behind obstacles) makes it more difficult to achieve uniform coverage from a single base station. Multi-point transmissions, where data is transmitted from multiple non-co-located transmission points to a receiver, e.g., from multiple base stations to a single mobile station, may be used to provide more uniform coverage. Such multi-point transmissions may be used for various wireless systems, e.g., 4G and 5G systems.

Conventional multi-point systems typically involve a small number of transmission points, e.g., two transmission points. However, the higher frequencies and higher capacity requirements of newer systems are expected to require the use of a large number of transmission points. Conventional systems and solutions, however, are unable to sufficiently manage the feedback expected for such a large number of transmission points. Thus, there remains a need for new ways to manage the feedback associated with multi-point systems.

SUMMARY

The solution presented herein manages the feedback from multiple transmission points by reducing the amount of feedback provided by a slave node to a controlling master node. In so doing, the solution presented herein provides improved multi-point transmissions for any number of transmission points, which improves capacity.

One exemplary embodiment comprises a method of managing feedback provided by a plurality of slave nodes to a controlling master node in a communication network comprising the master node and the plurality of slave nodes, where the plurality of slave nodes transmit data to a wireless device. The method may be implemented by the master node or one of the plurality of slave nodes. The method comprises determining whether there is a need for the slave node to provide feedback to the master node. Responsive to the determination of whether there is a need for the slave node to provide the feedback to the master node, the method further comprises operating in a reduced feedback mode that manages the feedback provided by the slave node to the master node such that an amount of feedback provided by the slave node when operating in the reduced feedback mode is less than an amount of feedback provided by the slave node when operating in a full feedback mode. In one exemplary embodiment, when the method is implemented in the master node, the method determines whether there is a need for the slave node to provide feedback by determining whether the master node has any packets to send to the slave node. If the master node has packets to send to the slave node, the master node determines there is a need for the slave node to provide feedback to the master node. If the master node does not have packets to send to the slave node for a predetermined time interval, the master node determines there is no need for the slave node to provide feedback to the master node. In another exemplary embodiment, when the method is implemented in the slave node, the method determines whether there is a need for the slave node to provide feedback to the master node by receiving a feedback mode signal from the master node. The feedback mode signal indicates whether the slave node needs to provide feedback to the master node. In another exemplary embodiment, when the method is implemented in the slave node, the method determines whether there is a need for the slave node to provide feedback to the master node by determining that the slave node does need to provide the feedback to the master node if the slave node has received packets from the master node during a predetermined time interval or if a queue of the slave node is not empty, and determining that the slave node does not need to provide the feedback to the master node if the slave node has not received any packets from the master node during the predetermined time interval and if the queue of the slave node is empty.

Another exemplary embodiment comprises an apparatus configured to manage feedback provided by a plurality of slave nodes to a controlling master node in a communication network comprising the master node and the plurality of slave nodes, where the plurality of slave nodes transmit data to a wireless device. The apparatus may be disposed in the master node or one of the plurality of slave nodes. The apparatus comprising one or more processing circuits configured to determine whether there is a need for the slave node to provide feedback to the master node. The one or more processing circuits are further configured to, responsive to the determination of whether there is a need for the slave node to provide the feedback to the master node, configure the apparatus to operate in a reduced feedback mode that manages the feedback provided by the slave node to the master node such that an amount of feedback provided for the slave node when operating in the reduced feedback mode is less than an amount of feedback provided by the slave node when operating in a full feedback mode. In one exemplary embodiment, when the apparatus is comprised in the master node, the one or more processing circuits determine whether there is a need for the slave node to provide feedback to the master node by determining whether the master node has any packets to send to the slave node. If the master node has packets to send to the slave node, the master node determines there is a need for the slave node to provide feedback to the master node. If the master node does not have packets to send to the slave node for a predetermined time interval, the master node determines there is no need for the slave node to provide feedback to the master node. In another exemplary embodiment, when the apparatus is comprised in the slave node, the slave node further comprises an interface circuit configured to receive a feedback mode signal from the master node indicating whether the slave node needs to provide feedback to the master node. The one or more processing circuits determine whether there is a need for the slave node to provide feedback to the master node responsive to the feedback mode signal. In another exemplary embodiment, when the apparatus is comprised in the slave node, the slave node comprises a queue and an interface circuit. For this exemplary embodiment, the one or more processing circuits determine whether there is the need for the slave node to provide feedback to the master node by determining that the slave node does need to provide the feedback to the master node if the interface circuit has received packets from the master node during a predetermined time interval or if the queue is not empty, and determining that the one or more processing circuits do not need to provide the feedback to the master node if the interface circuit has not received any packets from the master node during the predetermined time interval and if the queue is empty.

Another exemplary embodiment comprise a computer program product stored in a non-transitory computer readable medium for controlling a processing circuit to manage feedback provided by a plurality of slave nodes to a controlling master node in a communication network comprising the master node and the plurality of slave nodes, where the plurality of slave nodes transmit data to a wireless device. The computer program product comprising software instructions which, when run on the processing circuit in the master node or one of the plurality of slave nodes causes the processing circuit to determine whether there is a need for the slave node to provide feedback to the master node. The software instructions, when run on the processing circuit further causes the processing circuit to, responsive to the determination of whether there is a need for the slave node to provide the feedback to the master node, operate in a reduced feedback mode that manages the feedback provided by the slave node to the master node such that an amount of feedback provided by the slave node when operating in the reduced feedback mode is less than an amount of feedback provided by the slave node when operating in a full feedback mode. In one exemplary embodiment, when the processing circuit is comprised in the master node, the computer program product further comprises software instructions which, when run on the processing circuit in the master node causes the processing circuit to determine whether the master node has any packets to send to the slave node. If the master node has packets to send to the slave node, the master node determines there is a need for the slave node to provide feedback to the master node. If the master node does not have packets to send to the slave node for a predetermined time interval, the master node determines there is no need for the slave node to provide feedback to the master node. In another exemplary embodiment, when the processing circuit is comprised in the slave node, the computer program product further comprises software instructions which, when run on the processing circuit in the slave node causes the processing circuit to determine whether there is a need for the slave node to provide feedback to the master node by receiving a feedback mode signal from the master node. The feedback mode signal indicates whether the slave node needs to provide feedback to the master node. In another exemplary embodiment, when the processing circuit is comprised in the slave node, the computer program product further comprises software instructions which, when run on the processing circuit in the slave node causes the processing circuit to determine whether there is the need for the slave node to provide feedback to the master node by determining that the slave node does need to provide the feedback to the master node if the slave node has received packets from the master node during a predetermined time interval or if a queue of the slave node is not empty, and determining that the slave node does not need to provide the feedback to the master node if the slave node has not received any packets from the master node during the predetermined time interval and if the queue of the slave node is empty.

Another exemplary embodiment comprises an apparatus configured to manage feedback provided by a plurality of slave nodes to a controlling master node in a communication network comprising the master node and the plurality of slave nodes, wherein the plurality of slave nodes transmit data to a wireless device. The apparatus is disposed in the master node or one of the plurality of slave nodes. The apparatus comprises one or more processing modules configured to determine whether there is a need for the slave node to provide feedback to the master node. The one or more processing modules are further configured to, responsive to the determination of whether there is a need for the slave node to provide the feedback to the master node, configure the apparatus to operate in a reduced feedback mode that manages the feedback provided by the slave node to the master node such that an amount of feedback provided by the slave node when operating in the reduced feedback mode is less than an amount of feedback provided by the slave node when operating in a full feedback mode. In one exemplary embodiment, when the apparatus is comprised in the master node, the one or more processing modules determine whether there is a need for the slave node to provide feedback to the master node by determining whether the master node has any packets to send to the slave node. If the master node has packets to send to the slave node, the master node determines there is a need for the slave node to provide feedback to the master node. If the master node does not have packets to send to the slave node for a predetermined time interval, the master node determines there is no need for the slave node to provide feedback to the master node. In another exemplary embodiment, when the apparatus is comprised in the slave node, the slave node further comprises an interface module configured to receive a feedback mode signal from the master node indicating whether the slave node needs to provide feedback to the master node. The one or more processing modules then determine whether there is a need for the slave node to provide feedback to the master node responsive to the feedback mode signal. In another exemplary embodiment, when the apparatus is comprised in the slave node, the slave node comprises a queue module and an interface module. For this exemplary embodiment, the one or more processing modules determine whether there is the need for the slave node to provide feedback to the master node by determining that the slave node does need to provide the feedback to the master node if the interface module has received packets from the master node during a predetermined time interval or if the queue module is not empty, and determining that the one or more processing modules do not need to provide the feedback to the master node if the interface module has not received any packets from the master node during the predetermined time interval and if the queue module is empty

DETAILED DESCRIPTION

The solution presented herein solves numerous problems associated with the large amount of feedback potentially present in multi-point transmission systems, particularly those with a large number of transmission points. The split bearer flow control disclosed herein involves both generic flow control, as well as data flow control. Before the details of this solution are described, the following first provides some basic information regarding multi-point transmissions and the associated systems.

In massive multi-point transmission systems, such as those expected for 5G systems, where a receiver receives data transmitted by a large number of transmission points, each involved transmission point needs to be given access to all or portions of this data, for transmission over the wireless interface. It should here be noted that the different transmission points may transmit different data, the same data for diversity gain, or a mix of these alternatives. In many applications data from some transmission points may be closely related to data simultaneously being transmitted from other transmission points, e.g., when the data is video data. In this case, the receiving device, e.g., the UE, needs to receive all of the data transmitted from different transmission points for a specific part of the video at the same time (e.g., to within a certain pre-determined margin of error). Otherwise, the video cannot be displayed correctly at the UE.

Note also that 5G technology includes the concept of ultra-lean transmission. As such, user data may carry, in a piggy backed fashion, control channel data and system information. For this reason continuous transmission is often needed to keep a multi-point transmission path active.

Figure 1:
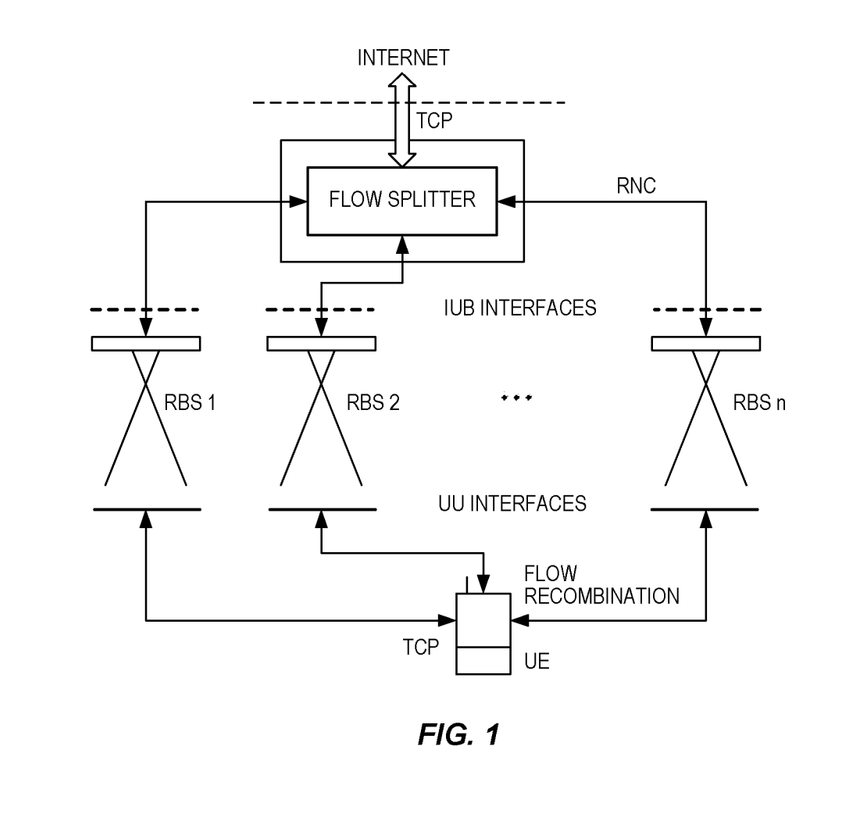
FIG. 1 shows an exemplary multi-point transmission system.

FIG. 1 shows an exemplary multi-point transmission system in terms of a 3G Wideband Code Division Multiple Access (WCDMA) system. Similar architectures in 4G and 5G could involve nodes from both the radio access network (RAN) and the core network (CN). The following explains the terminology used with respect to the operation of such a multi-point transmission system.

First, a number of representations of a dynamic process are introduced. A dynamic process is one where the output has memory, and therefore depends not only on the present input signal but also on previous inputs and outputs. The most basic dynamic process is a linear one, which may be described by a differential equation as:

$$y^{(N)}(t) + a_1 y^{(N-1)}(t) + \ldots + a_N = b_0 u^{(M)}(t) + \ldots + b_M u(t), \quad (1)$$

where y(t) represents an output signal, u(t) represents an input signal, t represents time, $^{(N)}$ represents $N^{th}$ order differentiation with respect to time, and $a_k$ and $b_l$ represent constant parameters where k=1, . . . , N and l=1, . . . , M. Equation (1) is an $N^{th}$ order differential equation with one input signal and one output signal. For simplicity, the following explanation stems from this single input, single output equation, but it will be appreciated that the following may easily be extended to multiple inputs and/or multiple outputs by those skilled in the art.

Taking the Laplace transform of Equation (1) and setting initial values to zero produces the following transfer function H(s), where s represents the Laplace transform variable.

$$H(s) = \frac{B(s)}{A(s)} = \frac{b_0 s^M + b_1 s^{M-1} + \ldots + b_M}{s^N + a_1 s^{N-1} + \ldots + a_N}. \quad (2)$$

The relationship between the output signal Laplace transform Y(s) and the input signal Laplace transform U(s) is therefore:

$$Y(s) = H(s)U(s), \quad (3)$$

where the poles ($p_k$, k=1, . . . , N) for this process may be given by A(s)=0. For simplicity, only strictly stable (e.g., open loop) processes with all poles in the left half of the complex plane are considered here. In general, however, the poles are real or complex conjugate pairs. It will be appreciated that the properties of the dynamic process may also be studied in the frequency domain in terms of complex valued frequency functions Y(jω), H(jω), and U(jω), where ω represents the angular frequency that fulfills ω=2πf, and where f represents the frequency in Hz.

Figure 2:
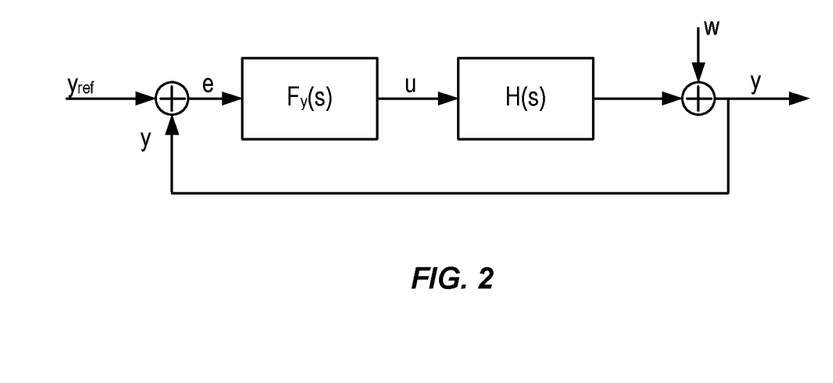
FIG. 2 shows a general block diagram for a closed-loop control system.

FIG. 2 shows a general block diagram for a closed-loop control system associated with Equation (3). In FIG. 2, $F_y(s)$ represents a feedback gain and W(s) represents a disturbance, e.g., noise. The closed-loop system may then be represented by:

$$Y(s) = W(s) + H(s)F_y(s)(Y_{ref}(s) - Y(s)), \quad (4)$$

which results in:

$$Y(s) = \frac{F_y(s)H(s)}{1 + F_y(s)H(s)} Y_{ref}(s) + \frac{1}{1 + F_y(s)H(s)} W(s). \quad (5)$$

Equation (5) shows the effect of the reference signal $Y_{ref}(s)$ and the disturbance W(s) on the output. The closed-loop bandwidth $\omega_{CL}$, of the control system may be represented by:

$$\left| \frac{F_y(j\omega_{CL})H(j\omega_{CL})}{1 + F_y(j\omega_{CL})H(j\omega_{CL})} \right|^2 = \frac{1}{2} \left| \frac{F_y(0)H(0)}{1 + F_y(0)H(0)} \right|^2. \quad (6)$$

The closed-loop static error of the control system may be given by:

$$y_{ref} - y = \frac{1}{1 + F_y(0)H(0)} (y_{ref} - w). \quad (7)$$

The static disturbance rejection of the control system may be given by the static sensitivity function:

$$S(0) = \frac{1}{1 + F_y(0)H(0)}, \quad (8)$$

while the dynamic disturbance rejection of the control system may be given by the sensitivity function:

$$S(j\omega) = \frac{1}{1 + F_y(j\omega)H(j\omega)}. \quad (9)$$

The complementary sensitivity function of the control system, $T(j\omega)=1-S(j\omega)$, determines the robustness of the control system with respect to un-modeled dynamics.

It will be appreciated that the discussion associated with FIGS. 1-2 and Equations (1)-(9) correspond to one transmission point of a multi-transmission point system, and the control of such a transmission point. It will be appreciated that the control of multi-transmission point systems increases in complexity as the number of transmission points increases.

One concern with multi-point transmission involves the expected increase in the number of users, and thus the amount of data/feedback, for 5G systems as compared to current 4G systems, where such feedback helps control the level of the transmit buffers in each transmitting node for each bearer. In particular, the feedback helps prevent a starvation dwell time, which is the dwell time that would undesirably increase the risk for an empty wireless transmit buffer above an acceptable starvation probability threshold, and an overflow dwell time, which is the dwell time that would undesirably increase the risk of an overflow associated with the transmit buffer above an acceptable overflow probability threshold. This large increase in the expected number of users means the number of controller algorithm instances, such as described by Equations (1)-(9), will also increase dramatically. In particular, the large increase means the amount of split bearer flow control algorithm instances will increase significantly. Because the split bearer flow controllers are based on the principle of feedback, the expected increase in the number of users will necessarily result in an increase of the amount of feedback information that needs to be signaled between the transmitting nodes and the controlling master node. Such an increase could undesirably impact the complexity of the overall control system used to control the multi-point transmission system. Further, low latency (i.e., round trip delay) requirements aggravate the complexities associated with this increased amount of feedback, because fundamentally, the feedback information must be signaled at least twice as fast (and preferably in practice at least 5-10 times as fast) as the required latency of the connection. Thus, new solutions for multi-point transmission systems are needed.

The solution presented herein provides control for a multi-point transmission system to manage the feedback provided by the multi-point transmission system. To that end, the solution presented herein reduces the amount of feedback provided by either deactivating/eliminating the feedback (e.g., when no feedback is needed) or reducing the amount of feedback relative to what would have been provided for a full feedback mode, e.g., by reducing signaling overhead and/or reducing the amount/size of the feedback information.

To simplify the discussion, the following describes the solution presented herein in terms of multiple transmit nodes comprising a master node and a slave node, where a split bearer flow control algorithm is implemented in the master node per bearer. The split bearer control algorithm is connected to a number of transmitting slave nodes, each of which is equipped with a queue per bearer and a wireless interface connection for transmission of the contents of the queue. While the solution is presented in terms of the feedback provided by a single slave node, it will be appreciated that the solution presented herein may be applied to each of a plurality of slave nodes in communication with a master node. While the terms "master" node and "slave" node as used herein can represent those nodes traditionally referred to as a master node and a slave node, it will be appreciated by those skilled in the art that, as used herein, the term "master node" represents the entity in the communication network that provides the master control function for the associated slave nodes and the equipment associated with the timing control solution presented herein, and the term "slave node" represents the entity in the communication network that provides the slave control function and equipment associated with the timing control solution presented herein. Thus, while the master node referred to herein may reside in a serving cell base station, such is not required. Further, while each master and slave node may reside in a different network node, it will be appreciated that such is not required. In some embodiments, for example, the master node and at least one slave node may both be comprised in a radio base station. In general, the solution presented herein assumes each slave node represents one transmission point of the multi-point transmission system. Further, the connection between the master node and the slave nodes is, e.g., via a 5G interface (e.g., 3GPP or Wifi), and this interface is associated with certain delays in the downlink (master to slave) and uplink (slave to master).

Figure 3:
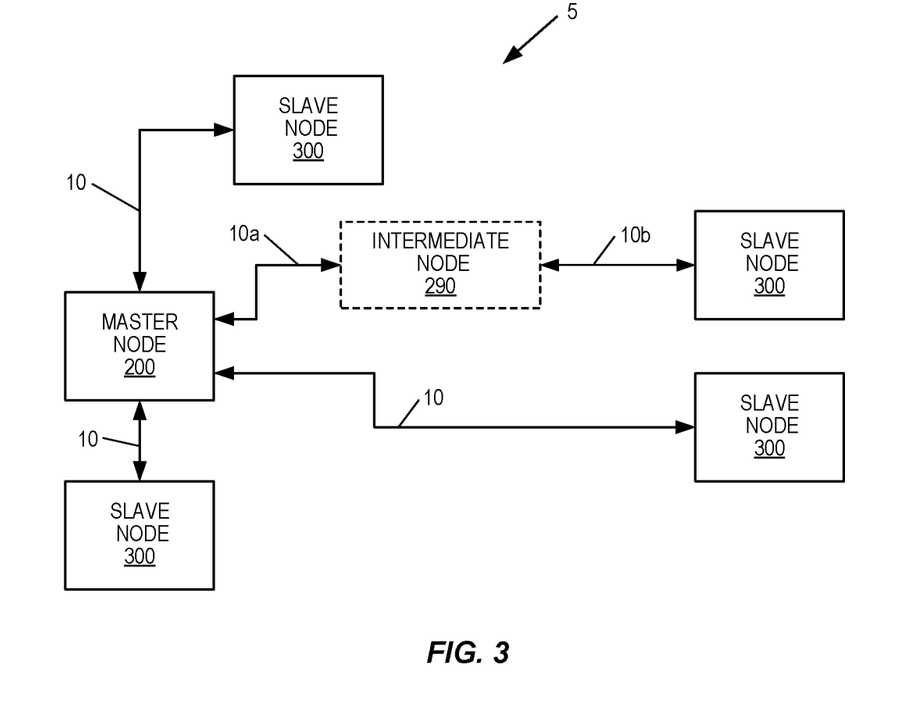
FIG. 3 shows a block diagram for a multi-point transmission system according to one exemplary embodiment.

FIG. 3 shows an exemplary multi-point communication system 5 comprising a master node 200 and a plurality of slave nodes 300. The slave nodes 300 each represent a transmission point of a multi-transmission point system, and thus each slave node 300 transmits wireless data to a wireless receiver, e.g., a mobile device or UE as shown in FIG. 1. The master node 200 communicates with the slave nodes 300 via individual communication channels 10, e.g., a backhaul channel. It will be appreciated that the communication channels 10 between the master node 200 and the slave nodes 300 may comprise wireless and/or wired backhaul communication channels. Further, as shown in FIG. 3, the master 200 may communicate directly with one or more of the slave nodes 300, or may communicate with one or more of the slave nodes 300 via an intermediate node 290, where the communication channel 10a is between the master node 200 and the intermediate node 290 and the communication channel 10b is between the intermediate node 290 and the slave node 300. When an intermediate node 290 is used to facilitate the communications between the master and slave nodes 200, 300, the intermediate node 290 conveys the information discussed further below, e.g., feedback information, from the slave node 300 (or from the master node 200) to the master node 200 (or to the slave node 300).

The solution presented herein manages the feedback provided by the slave node(s) 300 to the master node 200. To that end, the solution presented herein manages the flow control functionality provided by the slave node. Such flow control functionality includes, but is not limited to a measurement of feedback information, signaling of feedback information, and/or signaling of feedforward information, e.g., feedback and feedforward information associated with an inner control loop 100 between the master and slave nodes (see FIG. 5). The signaling associated with such flow control functionality is governed by feedback fundamentals, which controls a transmit queue of the slave node 300 so that it meets a pre-specified packet dwell time (equivalent to the queue dwell time delay contribution to the overall round trip time between the master and slave nodes). In particular, the governing feedback fundamentals require that (1) other delays of a data loop between the master node 200 and slave node 300 are less than (and preferably significantly less than) the required dwell time, and (2) the dwell time of the queue should be measured (e.g., sampled) at least twice as fast the required dwell time, and for good practical performance, more typically 5-10 times as fast. For example, if the required dwell time is 1 ms, then the feedback fundamentals require that the other delay components of the control loop are significantly less than 1 ms, and that the sampling of the dwell time is typically faster than 0.1 ms. Given these requirements, and the increasing feedback load associated with multi-point transmission systems, the desirability to reduce the amount of feedback being provided by the slave nodes 300 to the master node 200 becomes readily apparent.

Figure 4:
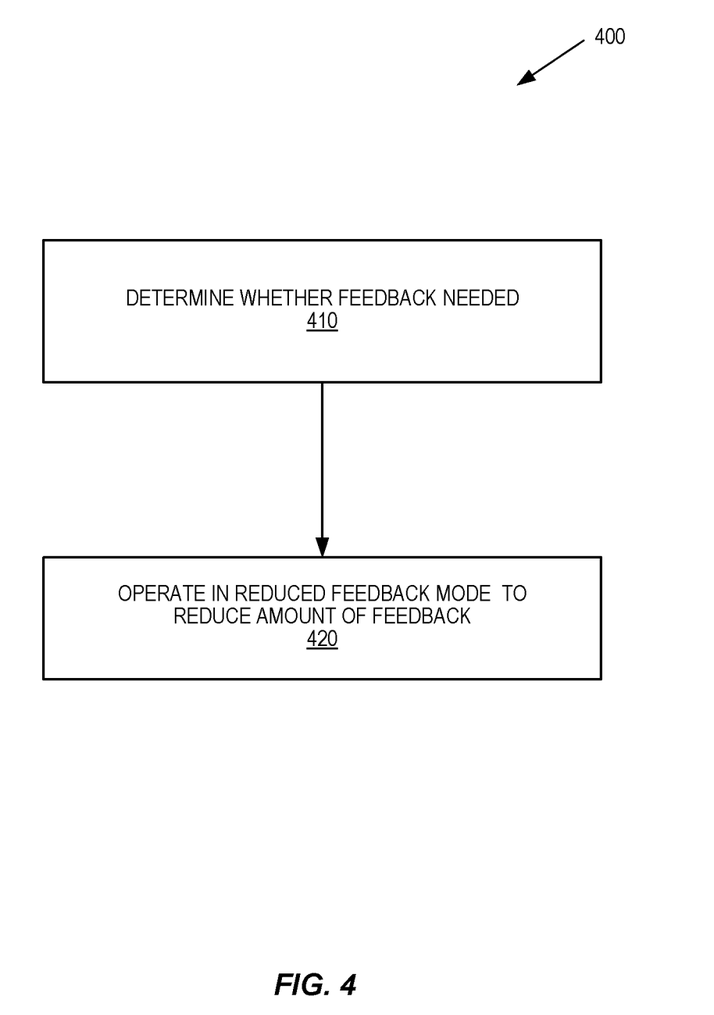
FIG. 4 shows a feedback management method according to one exemplary embodiment.

To manage the feedback provided by the slave node(s) 300 to the master node, the solution presented herein reduces the amount of feedback relative to conventional solutions. FIG. 4 shows one exemplary feedback reduction method 400 that may be implemented in a node, e.g., the master node 200 and/or any of the slave nodes 300. The exemplary method 400 comprises the node determining whether there is a need for the slave node 300 to provide feedback to the master node 200 (block 410). Responsive to this determination, the node operates in a reduced feedback mode that manages the feedback provided by the slave node 300 to the master node 200 such that an amount of feedback provided by the slave node when operating in the reduced feedback mode is less than an amount of feedback provided by the slave node 300 when operating in a full feedback mode (block 420). In other words, responsive to whether there is a need for the slave node 300 to provide feedback to the master node 200, the node reduces the amount of feedback provided by the slave relative to the full feedback mode.

Figure 5:
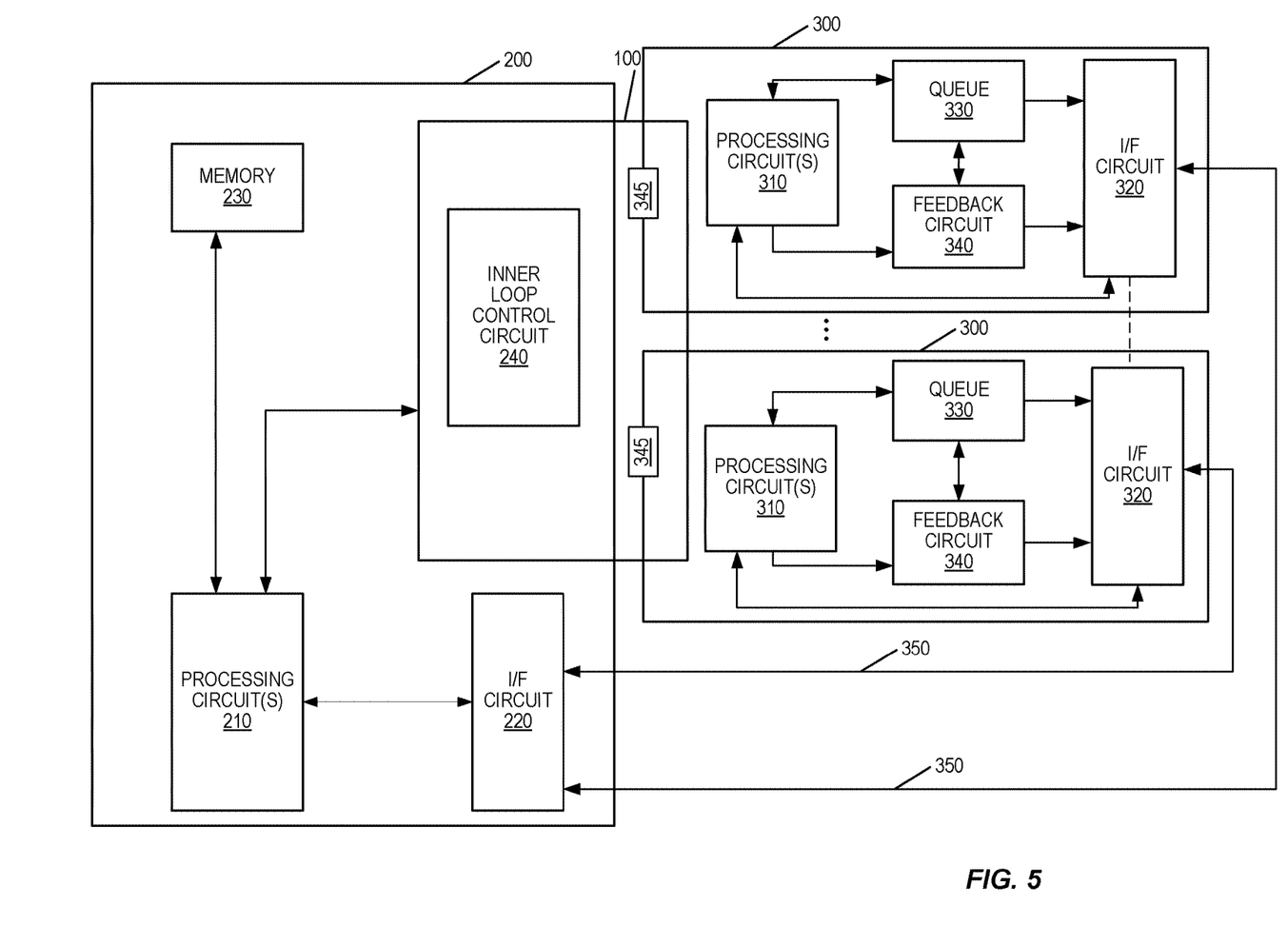
FIG. 5 shows a block diagram for the master and slave nodes of the multi-point transmission system according to one exemplary embodiment.

As indicated above, method 400 may be implemented by the master node 200 and/or the slave node(s) 300. The following first focuses on the details for the master node implementation, and then focuses on the details for the slave node implementation. To facilitate these discussions, FIG. 5 shows a block diagram of the master and slave nodes of the multi-point transmission system according to one exemplary embodiment. In particular, the block diagram of FIG. 5 shows a master node 200 connected to multiple slave nodes 300 via an inner control loop 100 and an external interface connection 350 for each slave node 300, where amongst other things, the interface connections 350 may provide the feedback path from the slave node 300 to the master node 200. It will be appreciated that the feedback is always provided via an interface between the master and slave nodes, where this interface may be interface connection 350 and/or the interface associated with the inner loop 100.

First, the exemplary embodiments where the master node 200 implements the feedback management method 400 are considered. To that end, the master node 200 may comprise one or more processing circuits 210, an interface circuit 220, a memory 230, and an inner loop control circuit 240. It will be appreciated that the inner loop control circuit 240 controls the inner loop circuitry (not shown) of the master node 200, and thus also controls the inner loop circuitry 345 of the slave nodes 300.

When the master node 200 implements method 400, the one or more processing circuits 210 determine whether there is a need for the slave node to provide feedback to the master node. In one exemplary embodiment, the one or more processing circuits 210 determine whether there is a need for the slave node 300 to provide feedback to the master node 200 by determining whether the master node 200 has any packets to send to the slave node 300. If the master node 200 has packets to send to the slave node 300, the processing circuit(s) 210 determine there is a need for the slave node 300 to provide feedback to the master node 200. However, if the master node 200 does not have packets to send to the slave node 300 for a predetermined time interval, the processing circuit(s) 210 determine there is not a need for the slave node 300 to provide feedback to the master node 200.

If the processing circuit(s) 210 determine there is not a need for the slave node 300 to provide feedback to the master node 200, the processing circuit(s) 210 may implement the reduced feedback mode to reduce the amount of feedback by deactivating (e.g., turning off) the flow control functionality implemented by the master node 200, which eliminates the feedback. For example, the processing circuit(s) 210 may save all states of the inner loop control circuit 240 of the master node 200 to the memory 230 and/or save the split bearer control context and code to the memory 230. The processing circuit(s) 210 may further switch the flow control functionality of the master node 200 to "off," which serves to halt the reception by the interface circuit 220 of the feedback information, feedback signaling, and/or feedforward signaling associated with the inner loop control circuit 240, and halt the operation of the inner control loop 100, e.g., by halting the operation of the inner loop control circuit 240 and any associated inner loop circuitry in the master and slave nodes. By halting the operation of the inner control loop 100, the processing circuit(s) 210 stop the reception of the feedback and feedforward signaling information associated with the inner control loop 100 over the same interface as for the split bearer signaling. When such flow control functionality is deactivated, the processing circuit(s) 210 may continue to use the most recently received feedback information. The processing circuit(s) 210 may further set an internal flag to indicate that the queue 330 of the slave node 300 is empty. Further, the processing circuit(s) 210 may send a deactivation control signal to the slave node, e.g., via interface circuit 220, to deactivate the flow control functionality executed by the slave node 300.

If the processing circuit(s) 210, after deactivating the flow control functionality of the master node 200, later determine there is a new need for the slave node 300 to provide feedback to the master node 200, the processing circuit(s) 210 may reactivate the flow control functionality of the master node 200. For example, the processing circuit(s) 210 may reactivate the flow control functionality by retrieving all saved states of the inner loop control circuit 240 from memory 230. The processing circuit(s) 210 may optionally restart reception, e.g., by the interface circuit 220, of the feedback information, feedback signaling, and/or feedforward signaling associated with the inner loop control circuit 240 according to the retrieved states, and restart the operation of the inner loop control circuit 240 according to the retrieved states. In this case, the processing circuit(s) 210 may optionally send an activation control signal via the interface circuit 220 to the slave node 300 to indicate to the slave node 300 the new need to provide feedback to the master node 200, and thus to activate/reactivate the flow control functionality of the slave node 300.

While not required, the processing circuit(s) 210 may send a feedback mode signal to the slave node via interface circuit 220. The feedback mode signal indicates to the slave node 300 that the slave node 300 should operate in the reduced feedback mode. In some embodiments, the feedback mode signal may further indicate to the slave node 200 how slave node 300 should reduce the amount of feedback provided to the master node 200.

Next, the exemplary embodiments where the slave node 300 implements the feedback management method 400 are considered. To that end, each slave node 300 may comprise one or more processing circuits 310, an interface circuit 320, a queue 330, and a feedback circuit 340. While not explicitly shown in detail or discussed further herein, each slave node 300 also includes inner loop circuitry 345 that works with the inner loop circuitry (not shown) and inner loop control circuit 240 of the master node 200 to form the inner control loop 100.

In some embodiments, when the slave node 300 implements method 400, the slave node 300 determines whether there is a need to provide feedback to the master node 200 responsive to a received signal. For example, the interface circuit 320 may receive a feedback mode signal from the master node 200 indicating whether the slave node 300 needs to provide feedback to the master node 200. The processing circuit(s) 310 then determine whether there is a need for the slave node 300 to provide feedback responsive to the received feedback mode signal. It will be appreciated that in some embodiments, the feedback mode signal may comprise the deactivation signal or activation signal sent by the master node 200.

In other embodiments, the slave node 300 may determine whether there is a need to provide feedback on its own. For example, the processing circuit(s) 310 may evaluate the interface circuit 320 and the contents of the queue 330. If the interface circuit 320 has received packets from the master node 200 during a predetermined time interval or if the queue is not empty, the processing circuit(s) 310 determine the slave node 300 needs to provide feedback to the master node 200. If the interface circuit 320 has not received any packets from the master node 200 during the predetermined time interval and the queue is empty, the processing circuit(s) 310 determine the slave node 300 does not need to provide feedback to the master node 200.

Regardless of how the slave node 300 makes the determination, the slave node 300 manages the feedback responsive to this determination. When the slave node 300 determines there is no need to provide feedback, the processing circuit(s) 310 manages the feedback by essentially eliminating the feedback. To that end, the processing circuit(s) 310 may deactivate the flow control functionality, e.g., measurement of feedback information, signaling of feedback information, and/or signaling of feedforward information, implemented by the slave node 300. If the slave node 300 later determines there is a need to provide feedback information, the processing circuit(s) 310 may subsequently reactivate the flow control functionality implemented by the slave node 300. For example, if the interface circuit 320 receives an activation control signal, or if the processing circuit(s) 310 detect packets in the queue 330 or detect that the interface circuit 320 has received packets from the master node 200, the processing circuit(s) 310 may activate (or reactivate) the flow control functionality implemented by slave node 300.

When the slave node 300 determines there is a need to provide feedback to the master node 200, the processing circuit(s) manage the feedback by reducing the amount of provided feedback relative to what would have been provided in a full feedback mode. In general, the goal is to reduce the amount of feedback provided to the master node 200 such that fundamental feedback control properties are still met. For example, the slave node 300 may provide a reduced amount of feedback that is still sufficient to keep the dwell time in a pre-specified interval to simultaneously avoid too low of a dwell time and too high of a dwell time. Too low of a dwell time would represent a starvation dwell time, which is the dwell time that would undesirably increase the risk for an empty wireless transmit buffer above an acceptable starvation probability threshold. Too high of a dwell time would represent an overflow dwell time, which is the dwell time that would undesirably increase the risk of an overflow associated with the transmit buffer above an acceptable overflow probability threshold.

In one embodiment, the processing circuit(s) 310 may configure the slave node 300 to operate in the reduced feedback mode by configuring the feedback circuit 340 to determine coarsely quantized feedback information. The processing circuit(s) 310 then configure the interface circuit 330 to send the coarsely quantized feedback information to the master node 200. Such coarsely quantized feedback information represents an imprecise estimate of the feedback information corresponding to the full feedback mode. Thus, the amount of feedback provided by such coarsely quantized feedback information is less than what would have been provided for the full feedback mode. In one embodiment, the feedback circuit 340 determines the coarsely quantized feedback information by determining an amount of data in the queue 330, where the determined amount represents the feedback for the full feedback mode. The feedback circuit 340 then determines what percentage of the queue's maximum limit represents the current contents of the queue 330, where the queue's maximum limit represents the maximum amount of data the queue 330 can store. The feedback circuit 340 may output this percentage as the coarsely quantized feedback information. Alternatively, feedback circuit 340 may round the determined percentage to the nearest whole percentage, and output this rounded percentage as the coarsely quantized feedback information. In still another alternative, feedback circuit 340 may round the determined percentage to the nearest range of percentages in a plurality of possible percentage ranges, and output this rounded percentage as the coarsely quantized feedback information. For example, there may be ten possible ranges of roughly the same size, e.g., 0%-10%, 10.01%-20%, . . . 90.01%-100%. It will be appreciated that other percentage ranges are possible, and that the percentage ranges may be of varying sizes. In any event, by providing the coarsely quantized feedback to the master node 200, the slave node reduces the amount of provided feedback while keeping the dwell time resulting from such feedback within desirable limits.

In another exemplary embodiment, the processing circuit(s) 310 may configure the slave node 300 to operate in the reduced feedback mode by having the slave node 300 provide feedback for multiple bearers to the master node 200. Such an approach reduces the amount of overhead required to send the feedback for all of these bearers, and thus reduces the amount of provided feedback. In this embodiment, interface circuit 320 is configured to collect feedback for one or more bearers associated with the slave node 300. The processing circuit(s) 310 compile the collected feedback into a composite feedback message, and then configure the interface circuit 320 to send the composite feedback message to the master node 200. In so doing, the total amount of feedback provided for multiple bearers is reduced, where the reduction is due, e.g., to the reduction of signaling overhead in terms of headers. More particularly, by compiling the collected feedback into a composite feedback message, there is no longer a need for the slave node 300 to separately send each of the collected feedback information, where each of these individual messages would require a header. Thus, this embodiment reduces the amount of feedback at least by reducing the amount of header information being conveyed.

In another exemplary embodiment, the processing circuit(s) 310 configure the slave node 300 to operate in the reduced feedback mode by configuring the feedback circuit 340 to represent the feedback information in terms of an error signal. For example, the feedback circuit 340 may estimate an error of the feedback from a difference between the expected information in a packet received by the interface circuit 320 and the actual information in the received packet. The processing circuit(s) 310 then configure the interface circuit to send the estimated error to the master node 200. In so doing, the processing circuit(s) 310 reduce the dynamic range of the feedback, and thus also reduce the signaling overhead.

It will be appreciated that in some embodiments various elements disclosed herein comprise some kind of circuit. For example, the processor(s), interface, memory, inner loop controller, queue, feedback, and/or inner loop elements of the master and slave nodes 200, 300 may be implemented as, e.g., processor circuit(s), interface circuits, memory circuits, inner loop control circuits, queue circuits, feedback circuits, inner loop circuitry, etc. As such, the master node 200 may comprise a master node circuit 200 comprising one or more processing circuit(s) 210, an interface circuit 220, a memory circuit 230, and an inner loop control circuit 240, as shown in FIG. 5. Similarly, the slave node(s) 300 of FIG. 5 may comprise a slave node circuit 300 comprising one or more processing circuit(s) 310, an interface circuit 320, queue circuits 330, feedback circuits 340, and inner loop circuitry 345, as shown in FIG. 5. Each of these circuits may be embodied in hardware and/or in software (including firmware, resident software, microcode, etc.) executed on a controller or processor, including an application specific integrated circuit (ASIC).

Figure 6:
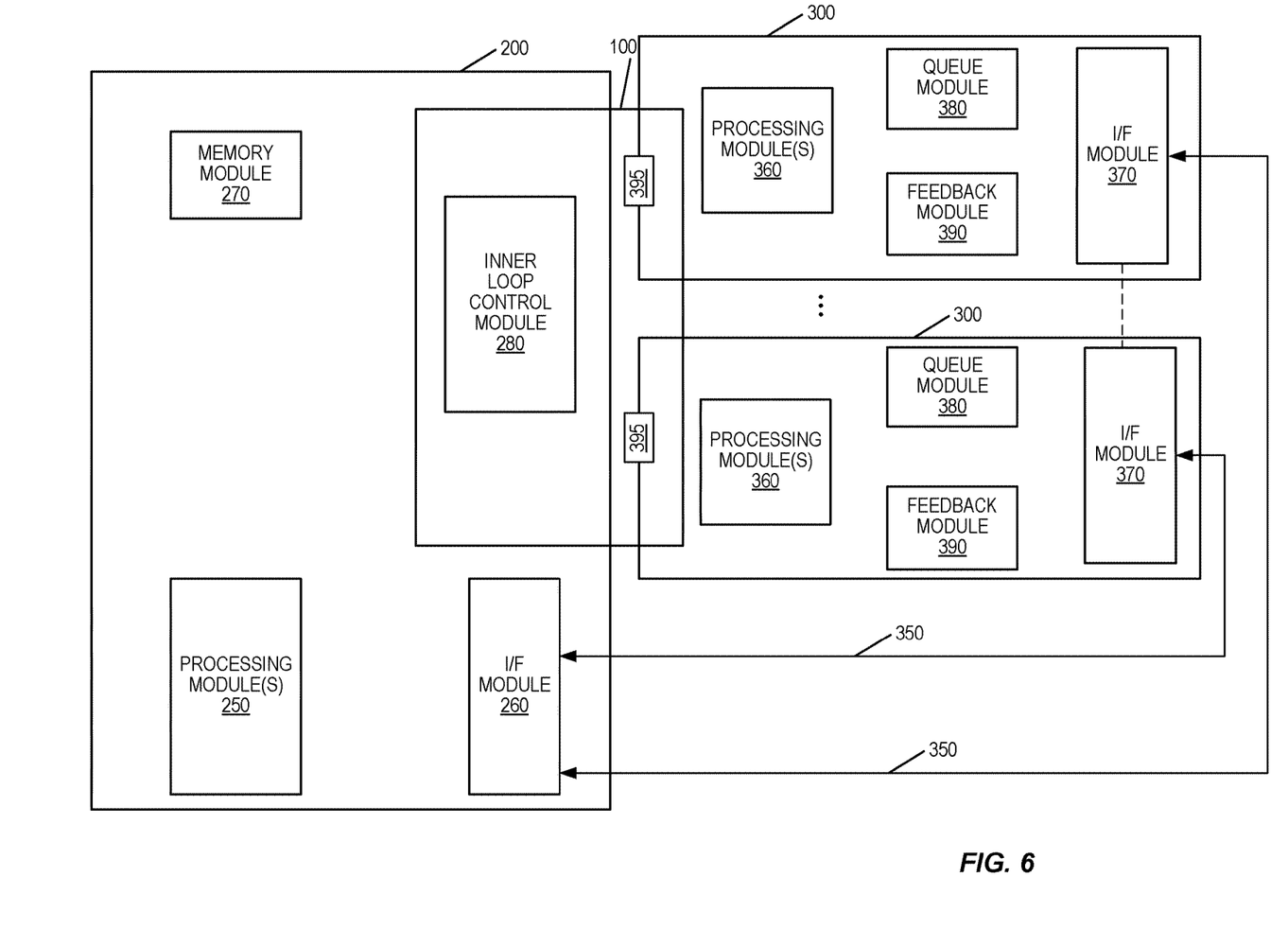
FIG. 6 shows a block diagram for the master and slave nodes of the multi-point transmission system according to another exemplary embodiment.

It will also be appreciated that in other embodiments, various elements disclosed herein comprise some kind of module configured to execute the described function, e.g., method 400. For example, the processor, interface, memory, inner loop controller, queue, feedback, and/or inner loop elements of the master and slave nodes 200, 300 may be implemented as, e.g., processing modules, interface modules, memory modules, inner loop control modules, queue modules, feedback modules, inner loop modules, etc. As such, the master node 200 may comprise a master node module 200 comprising one or more processing module(s) 250, an interface module 260, a memory module 270, and an inner loop control module 280, as shown in FIG. 6. Similarly, the slave node(s) 300 may comprise a slave node module 300 comprising one or more processing module(s) 360, an interface module 370, queue module 380, feedback module 390, and inner loop modules 395, as shown in FIG. 6.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

What is claimed is:

1. A method of managing feedback provided by a plurality of slave nodes to a controlling master node in a communication network comprising the master node and the plurality of slave nodes, wherein the plurality of slave nodes transmit data to a wireless device, the method performed by the master node or one of the plurality of slave nodes, the method comprising:
   determining whether there is a need for the slave node to provide feedback to the master node; and
   responsive to the determination of whether there is a need for the slave node to provide feedback to the master node, operating in a reduced feedback mode that manages the feedback provided by the slave node to the master node such that an amount of feedback provided by the slave node when operating in the reduced feedback mode is less than an amount of feedback provided by the slave node when operating in a full feedback mode.

2. An apparatus configured to manage feedback provided by a plurality of slave nodes to a controlling master node in a communication network comprising the master node and the plurality of slave nodes, wherein the plurality of slave nodes transmit data to a wireless device, the apparatus disposed in the master node or one of the plurality of slave nodes, the apparatus comprising one or more processing circuits configured to:
   determine whether there is a need for the slave node to provide feedback to the master node; and
   responsive to the determination of whether there is a need for the slave node to provide the feedback to the master node, configure the apparatus to operate in a reduced feedback mode that manages the feedback provided by the slave node to the master node such that an amount of feedback provided by the slave node when operating in the reduced feedback mode is less than an amount of feedback provided by the slave node when operating in a full feedback mode.

3. The apparatus of claim 2 wherein the apparatus is comprised in the master node, and wherein the one or more processing circuits determine whether there is a need for the slave node to provide feedback to the master node by:
   determining whether the master node has any packets to send to the slave node;
   determining there is a need for the slave node to provide feedback to the master node if the master node has packets to send to the slave node; and
   determining there is not a need for the slave node to provide feedback to the master node if the master node does not have any packets to send to the slave node for a predetermined time interval.

4. The apparatus of claim 3 wherein the one or more processing circuits configure the apparatus to operate in the reduced feedback mode by deactivating flow control functionality implemented by the master node to eliminate the feedback if the one or more processing circuits determine there is no need for the slave node to provide feedback to the master node.

5. The apparatus of claim 4 wherein the master node comprises a memory, an inner loop control circuit, and an interface circuit, wherein the one or more processing circuits deactivate the flow control functionality implemented by the master node by:
   saving all states of the inner loop control circuit in the master node to the memory;

halting reception by the interface circuit of at least one of feedback information, feedback signaling, and feedforward signaling associated with the inner loop control circuit; and halting, at the master node, operation of the inner loop control circuit.

6. The apparatus of claim 4 wherein the master node further comprises an interface circuit configured to send a deactivation control signal to the slave node to deactivate flow control functionality executed by the slave node if the one or more processing circuits determine there is no need for the slave node to provide feedback to the master node.

7. The apparatus of claim 4 wherein the one or more processing circuits are further configured to reactivate the flow control functionality implemented by the master node if the one or more processing circuits subsequently determine there is a new need for the slave node to provide feedback to the master node.

8. The apparatus of claim 7 wherein the master node further comprises an interface circuit, wherein the one or more processing circuits are further configured to send an activation control signal to the slave node via the interface circuit, the activation control signal indicating the new need for the slave node to provide feedback to the master node to reactivate the flow control functionality of the slave node.

9. The apparatus of claim 2 wherein the apparatus is comprised in the master node, and wherein the one or more processing circuits are further configured to send a feedback mode signal to the slave node via an interface circuit in the master node, wherein the feedback mode signal indicates to the slave node that the slave node should operate in the reduced feedback mode.

10. The apparatus of claim 9 wherein the feedback mode signal further indicates how the slave node should reduce the amount of feedback provided to the master node when operating in the reduced feedback mode.

11. The apparatus of claim 2:
wherein the apparatus is comprised in the slave node;
wherein the slave node further comprises an interface circuit configured to receive a reduced feedback mode signal from the master node indicating whether the slave node needs to provide feedback to the master node; and
wherein the one or more processing circuits determine whether there is a need for the slave node to provide feedback to the master node responsive to the reduced feedback mode signal.

12. The apparatus of claim 2:
wherein the apparatus is comprised in the slave node;
wherein the slave node further comprises a queue and an interface circuit; and
wherein the one or more processing circuits determine whether there is the need for the slave node to provide feedback to the master node by:
determining that the slave node does need to provide the feedback to the master node if the interface circuit has received packets from the master node during a predetermined time interval or if the queue is not empty; and
determining that the slave node does not need to provide the feedback to the master node if the interface circuit has not received any packets from the master node during the predetermined time interval and if the queue is empty.

13. The apparatus of claim 11 wherein the one or more processing circuits configure the slave node to operate in the reduced feedback mode by deactivating flow control functionality implemented by the slave node when the one or more processing circuits determine there is no need to provide feedback to the master node.

14. The apparatus of claim 13 wherein the one or more processing circuits are further configured to reactivate the flow control functionality if the one or more processing circuits subsequently determine there is a new need for the slave node to provide feedback to the master node.

15. The apparatus of claim 11 wherein the slave node comprises a feedback circuit and an interface circuit, and wherein the one or more processing circuits configure the slave node to operate in the reduced feedback mode by:
configuring the feedback circuit to determine coarsely quantized feedback information representing an imprecise estimate of the feedback information corresponding to the full feedback mode when the one or more processing circuits determine there is a need to provide feedback to the master node; and
configuring the interface circuit to send the coarsely quantized feedback information to the master node.

16. The apparatus of claim 15 wherein the feedback circuit determines the coarsely quantized feedback estimation by:
determining an amount of data in a queue of the slave node, wherein said measured amount represents the feedback for the full feedback mode, and wherein the queue has a maximum limit;
determining what percentage of the maximum limit represents the determined amount of the data in the queue; and
rounding the determined percentage to the nearest whole percentage.

17. The apparatus of claim 15 wherein the feedback circuit determines the coarsely quantized feedback estimation by:
determining an amount of data in a queue of the slave node, wherein said determined amount represents the feedback for the full feedback, and wherein the queue has a maximum limit;
determining what percentage of the maximum limit represents the determined amount of the data in the queue;
determining a plurality of possible ranges of percentages between 0% and 100%; and
rounding the determined percentage to the nearest range of percentages in the plurality of possible ranges of percentages.

18. The apparatus of claim 11 wherein the slave node further comprises an interface circuit, and wherein the one or more processing circuits configure the slave node to operate in the reduced feedback mode by:
configuring the interface circuit to receive feedback at the slave node from one or more bearers associated with the slave node when the one or more processing circuits determine there is a need to provide feedback to the master node;
compiling the collected feedback into a composite feedback message; and
configuring the interface circuit to send the composite feedback message to the master node.

19. The apparatus of claim 11 wherein the slave node further comprises an interface circuit and a feedback circuit, and wherein the one or more processing circuits configure the slave node to operate in the reduced feedback mode by:
configuring the interface circuit to receive a packet;
configuring the feedback circuit to estimate an error of the feedback from a difference between expected information in the received packet and actual information in the received packet when the one or more processing circuits determine there is a need to provide feedback to the master node; and configuring the interface circuit to send the estimated error to the master node.

20. A computer program product comprising a non-transitory computer readable medium for controlling a processing circuit to manage feedback provided by a plurality of slave nodes to a controlling master node in a communication network comprising the master node and the plurality of slave nodes, wherein the plurality of slave nodes transmit data to a wireless device, the non-transitory computer readable medium storing program instructions which, when executed by the processing circuit in the master node or one of the plurality of slave nodes causes the processing circuit to:

determine whether there is a need for the slave node to provide feedback to the master node; and responsive to the determination of whether there is a need for the slave node to provide the feedback to the master node, operate in a reduced feedback mode that manages the feedback provided by the slave node to the master node such that an amount of feedback provided by the slave node when operating in the reduced feedback mode is less than an amount of feedback provided by the slave node when operating in a full feedback mode.

* * * * *